(12) United States Patent
Sironi et al.

(10) Patent No.: US 8,289,174 B2
(45) Date of Patent: Oct. 16, 2012

(54) SEALING BOLT

(75) Inventors: Marco Sironi, Laveno-Mombello (IT);
Piercarlo Tebaldi, Brebbia (IT); Paolo Timossi, Arquata Scrivia (IT)

(73) Assignee: The European Union, Represented by the European Commission (BE)

( * ) Notice: Subject to any disclaimer, the term of this patent is extended or adjusted under 35 U.S.C. 154(b) by 846 days.

(21) Appl. No.: 12/280,297

(22) PCT Filed: Feb. 16, 2007

(86) PCT No.: PCT/EP2007/051530
§ 371 (c)(1),
(2), (4) Date: Feb. 20, 2009

(87) PCT Pub. No.: WO2007/096312
PCT Pub. Date: Aug. 30, 2007

(65) Prior Publication Data
US 2009/0235700 A1      Sep. 24, 2009

(30) Foreign Application Priority Data
Feb. 23, 2006   (EP) .................................... 06110349

(51) Int. Cl.
*G08B 21/00* (2006.01)
*B41J 2/175* (2006.01)
(52) U.S. Cl. ........ 340/621; 340/618; 340/624; 340/605; 374/86

(58) Field of Classification Search .................. 340/603, 340/604, 605, 617, 618, 619, 620, 621, 624, 340/572.1; 347/49, 50, 84–87, 92, 93; 206/710, 206/711, 712, 459.5; 600/573
See application file for complete search history.

(56) References Cited

U.S. PATENT DOCUMENTS

| 4,428,384 | A  | * | 1/1984  | Raitto ........................... 600/573 |
| 6,273,261 | B1 | * | 8/2001  | Hosoi ........................... 206/711  |
| 6,824,258 | B2 | * | 11/2004 | Yamamoto et al. ............. 347/86 |
| 6,945,642 | B2 | * | 9/2005  | Yamamoto et al. ............. 347/86 |

FOREIGN PATENT DOCUMENTS

| WO | 9406006 | 3/1994 |
| WO | 9933045 | 7/1999 |

OTHER PUBLICATIONS

International Search Report PCT/EP2007/051530; Dated May 11, 2007.

* cited by examiner

*Primary Examiner* — Van T. Trieu
(74) *Attorney, Agent, or Firm* — Cantor Colburn LLP

(57) ABSTRACT

A sealing bolt for sealing a container lid to a container body, the sealing bolt including: a first identity element configured so as to provide a first identification signal when sensed with an ultrasonic reading device; a second identity element configured so as to provide a second identification signal when sensed with an ultrasonic reading device; and a third identity element. The third identity element includes the first and second identity elements and a third identification signal is formed by the intersection points created by an overlap of the first and second identification signals. The invention also concerns a method for sealing a container lid to a container body using such a sealing bolt.

17 Claims, 3 Drawing Sheets

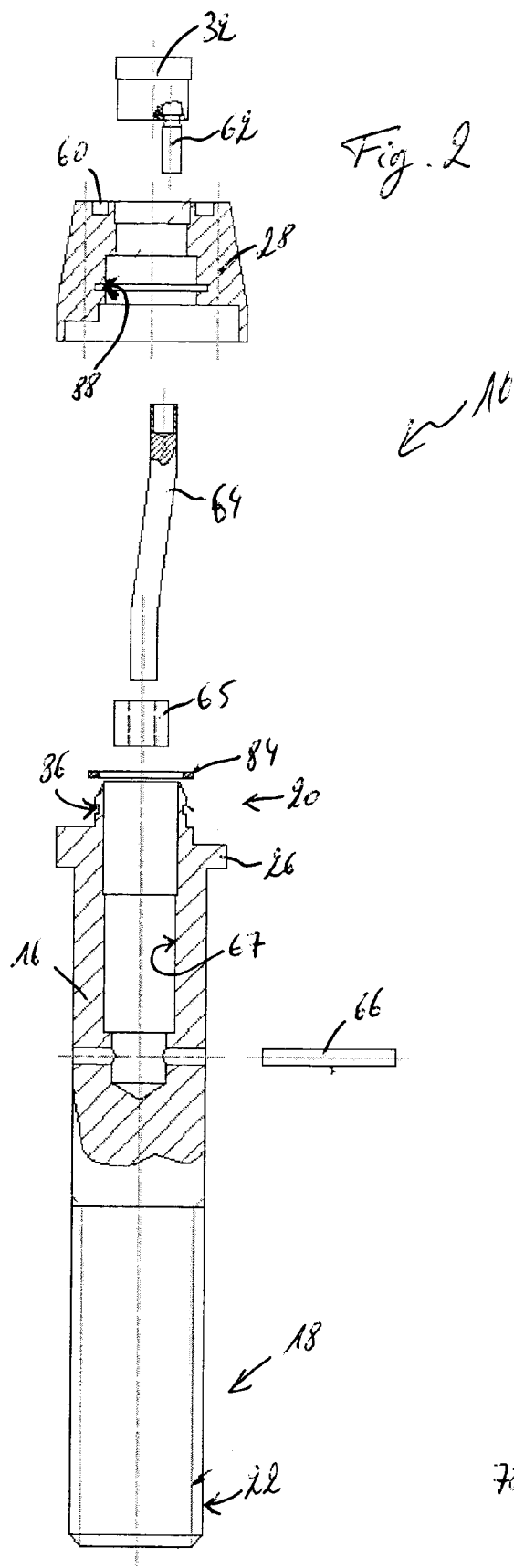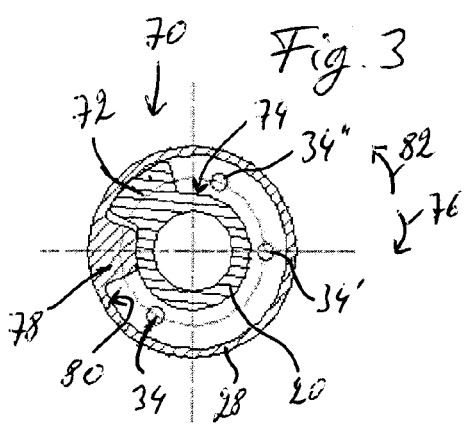

SEALING BOLT

TECHNICAL FIELD OF THE INVENTION

The present invention relates to a sealing bolt for sealing a container lid to a container body, in particular for sealing a container comprising nuclear fuel. The present invention also relates to a method for sealing such a container.

BRIEF SUMMARY OF RELATED ART

The sealing of containers is often necessary for security reasons. Secure sealing of a container is of particular importance in case the container holds dangerous substances, such as for example fissile materials. It is further important to be able to easily identify the container and thereby its contents. Sealing devices, such as sealing bolts, are therefore often provided with identification elements. In an effort to increase security of the seal, such identification elements are often concealed and difficult to tamper with. Furthermore, in order to be able to verify if the sealing device has been tampered with or broken, the sealing bolt is generally provided with an integrity element that breaks when the sealing bolt is opened.

Depending on the contents of the container, it can be of great importance to be sure that the container has not been tampered with and that its content is still intact. If the identity of the sealing bolt does not match and/or if the integrity element is broken, it can be concluded that the sealing device, and possibly the contents of the container, has been tampered with.

Although the identification and integrity elements of the sealing bolts offer a certain amount of security, this security is, in certain cases, not sufficient. Indeed, although not easy, identification elements and integrity elements can to a certain extent be copied and reproduced. Generally, sealing bolts are designed to break when removed, thereby making the original sealing bolt unusable for sealing the container after tampering with the contents of the container. It is however not excluded to replace the original sealing bolt with a new one, in which the identity elements have been carefully matched to the ones in the original sealing bolt. New replacement integrity elements can also be provided. Once the container is again sealed using the new sealing bolt. The sealing bolt may not appear tampered with, in which case the intrusion might go undetected.

There is hence a need for further improving the security of such sealing bolts.

BRIEF SUMMARY OF THE INVENTION

The invention provides a sealing bolt with improved security features. The invention further provides an improved method for sealing a container lid to a container body and for verifying the integrity of such a seal.

The present invention proposes a sealing bolt for sealing a container lid to a container body, the sealing bolt comprising a first identity element configured so as to provide a first identification signal when sensed with an ultrasonic reading device; a second identity element configured so as to provide a second identification signal when sensed with an ultrasonic reading device; and a third identity element, wherein the third identity element comprises the first and second identity elements, a third identification signal being formed by the intersection points created by an overlap of the first and second identification signals.

The first and second identity elements each provide a security element that is generally considered to be unique and difficult to falsify. The overlap of the first and second identification signals of the first and second identity elements forms a third identification signal, which further increases the uniqueness and complexity of the identification of the sealing bolt. Even, in the unlikely event of somebody successfully imitating one or both of the first and second identity elements, the correct signal from the third identity element is only achieved if the first and second identity elements are arranged in a particular arrangement with respect to each other. The assurance of being able to determine whether the sealing bolt has been tampered with—or even if such an attempt was made—is hence further increased. Indeed, in order to counterfeit the sealing bolt of the present invention, not only do the first and second identity elements have to be copied with high position, but they also have to be positioned in the right configuration in order to match the third identification signal.

The sealing bolt can comprise a seal body and a seal head.

Preferably, the first identity element is arranged between the seal body and the seal head, joined to the seal head. Such an arrangement allows the first identity element to be hidden from view and to be impossible to access or handle. The second identity element is preferably arranged in the seal head.

The sealing bolt can have a generally circular cross-section, wherein the first identity element is arranged in a central portion thereof, and the second identity element is arranged in a peripheral area thereof. Each of the first and second identity elements can comprise further information, unrelated to the identity of the sealing bolt. By arranging the first and second identity elements in two separate zones, the first and second identity elements can be identified individually and information contained therein can be retrieved individually.

Preferably, at least one of the first and second identity elements comprises a stack of disks with randomly arranged notches, therein the disks can be arranged at a random angular position to each other. Due to the random arrangement of the disks, each identity element has a unique identification signal, which is almost impossible to reproduce.

Preferably, at least one of the first and second identity elements comprises a plurality of bores having random position and/or depth. Such an identity element provides a unique identification signal, which is easy to produce but difficult to reproduce.

The sealing bolt can further comprise a storing device for storing installation data. Installation data, such as e.g. the time and place of sealing, the identity of the person responsible for sealing, the contents of the container, the provenance and/or destination of the container, can be stored in the storing device of the sealing bolt and retrieved for verification at any time.

The sealing bolt can further comprise an integrity element arranged between the seal body and the seal head such that, when the seal head is rotated with respect to the seal body, the integrity element is broken. Such an integrity element can, if broken, provide a further indication that the sealing bolt has been tampered with.

The sealing bolt can further comprise a torque pin for linking the integrity element to the seal body.

An entrainment element can further be arranged between the seal body and the seal head, the entrainment element being arranged such that, when the seal head is rotated in a first direction, the seal body is entrained in rotation in the first direction by the seal head; and such that, when the seal head is rotated in a second direction, opposite to the first direction, the seal body is not entrained in rotation by the seal head. The first direction is preferably a tightening direction of the sealing bolt and the second direction is a loosening direction of the sealing bolt. This allows tightening of the sealing bolt by applying a certain torque to the seal head. Once the sealing bolt has been installed, rotation of the seal head in a loosening direction does not entrain the seal body in the loosening direction. The seal body cannot be loosened by rotating the seal head in the loosening direction without breaking the integrity element.

The seal head of the bolt can be configured and dimensioned so as to at least partially fit in a recess arranged in a container body or container lid of the container to be sealed. Such an arrangement further increases the difficulty to tamper with the sealing bolt.

The present invention further concerns a method for sealing a container lid to a container body, wherein the method comprises the steps of providing a sealing bolt having a first identity element, a second identity element and a third identity element, the first and second identity elements providing first and second identification signals respectively when senses with an ultrasonic reading device, a third identification signal being formed by the intersection points created by an overlap of the first and second identification signals; connecting the container lid to the container body; and connecting the sealing bolt between the container lid and the container body, such that the sealing bolt is at least partially broken if the container lid and the container body are separated.

Preferably, the first, second and third identification signals are stored in a storing device.

A method for verifying the identity of a sealed container, preferably comprises the steps of measuring a first identification signal from the first identity element; measuring a second identification signal from the second identity element; forming the third identification signal from the intersection points obtained by an overlapping of the first and second identification signals; comparing the first, second and third identification signals with corresponding signals obtained after sealing of the container; and concluding to a possible tampering of the sealing bolt if at least one of the newly measured signals does not correspond to its previously measured counterpart.

BRIEF DESCRIPTION OF THE DRAWINGS

The present invention will be more apparent from the following description of a not limiting embodiment with reference to the attached drawings, wherein

FIG. 2 shows an exploded view of the sealing bolt of FIG. 1;

FIG. 3 shows a cut through the sealing bolt across line A-A of FIG. 1; and

DETAILED DESCRIPTION OF THE INVENTION

Figure 1:
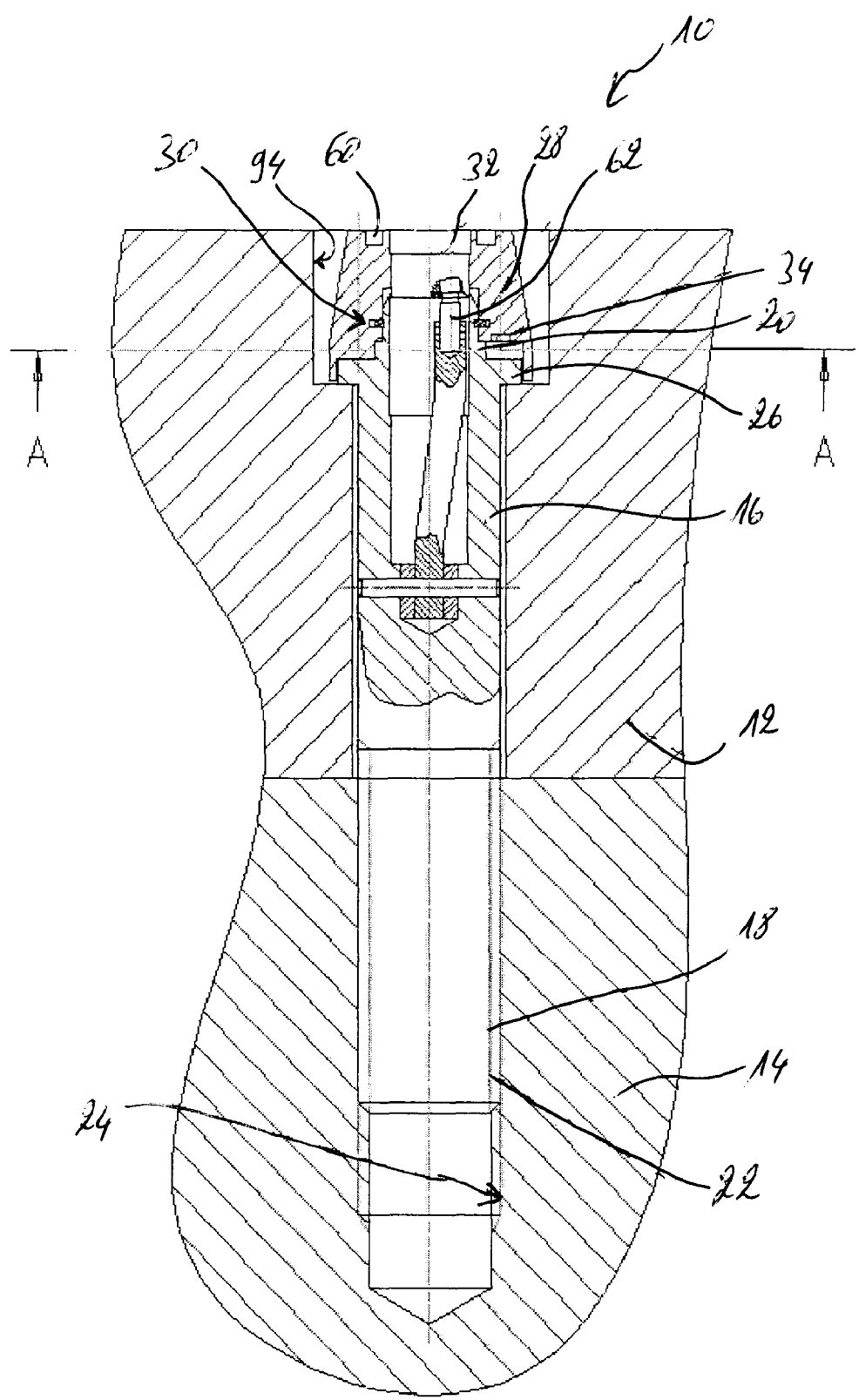
FIG. 1 shows a cut through an installed sealing bolt according to the invention.

A sealing bolt 10 for sealing a container lid 12 to a container body 14 is shown in FIG. 1. Such a sealing bolt 10 generally comprises a seal body 16 having a first end 18 and an opposite second end 20. The first end 18 comprises a threaded portion 22 for interacting with a threaded borehole 24 of the container body 14. The seal body 16 comprises, between its first and second ends 18, 20, a radial protrusion 26 for sandwiching the container lid 12 between the radial protrusion 26 and the container body 14, thereby sealing the container lid 12 to the container body 14. The second end 20 of the seal body 16 comprises connection means 30 for receiving a seal head 28 covering the second end 20 of the seal body 16.

The sealing bolt 10 is provided with identity elements in order to identify individual sealing bolts.

A first identity element 32 is arranged in a central portion of the seal head 28 and is e.g. formed by a stack of disks with randomly arranged notches. Such a stack of disks is formed by providing a plurality of disks, preferably of identical or at least similar diameter, providing the disks with notches, and stacking the disks in a random fashion such that the notches are arranged in a random angular position with respect to each other. The individual disks are then preferably welded together so as to maintain the angular position of the individual disks. The random arrangement of the notches provides the stack of disks with a unique identification. The identity of such a first identity element 32 can be read with ultrasonic reading device, thereby providing a first identification signal. Preferably, the first identity element 32 is arranged inside the seal head 28, facing the seal body 16. The first identity element 32 can be arranged in the lower part of the seal head 28 and at least partially extend into the second end 20 of the seal body 16. Such an arrangement allows the first identity element 32 to be hidden from view and protected.

A second identity element 34 is arranged in the seal head 28 and is e.g. formed by a plurality of holes drilled at different depths into the seal head 28. The holes are drilled with random depth in a random angular arrangement, thereby providing a unique identification. The identity of such a second identity element 34 can be read with ultrasonic reading device, thereby providing a second identification signal.

Figure 4:
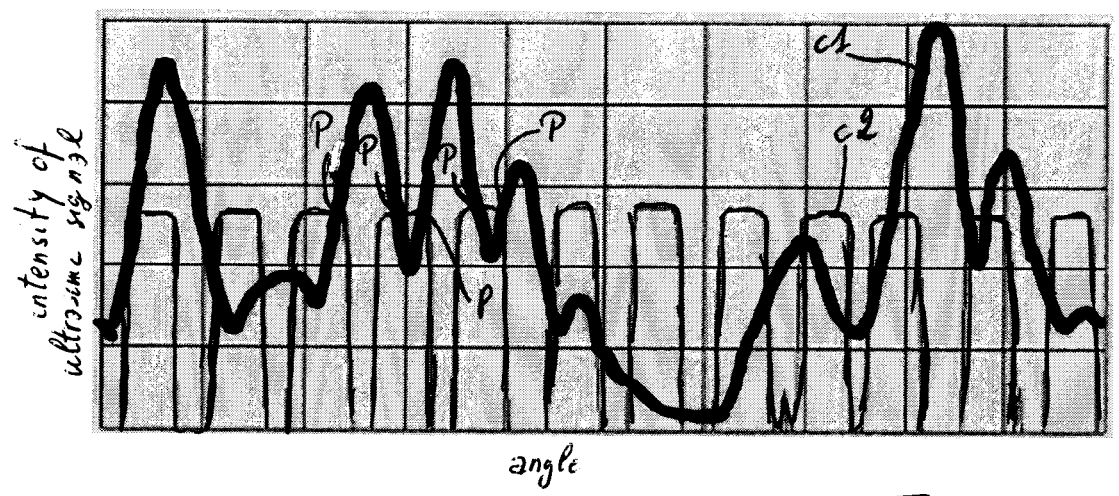
FIG. 4 shows a graph representing the first and second identification signals.

The first and second identification signals, respectively retrieved from the first and second identity elements 32, 34, are represented in FIG. 4, wherein the first identification signal is represented by curve c1 and the second identification signal is represented by curve c2. As can be seen, the curves c1 and c2 overlap and form a plurality of intersection points P (only some of which are indicated in FIG. 4). These intersection points P between the two curves c1 and c2 form a third identification signal. A third identity element is hence formed by the combination of the first and second identity elements 32, 34. The position of the intersection points P depends on the position of the first identity element 32 with respect to the second identity element 34. It follows that the precise position of the first and second identity elements 32, 34 with respect to each other becomes of importance for the identification of the sealing bolt 10.

If an attempt is made to counterfeit a sealing bolt 10 according to the invention, the counterfeiter must not only copy the first and second identity elements 32, 34 with great precision, but he must also arrange them with great accuracy in order to achieve the three identification signals of the original sealing bolt 10. The probability of correctly identifying whether the sealing bolt 10 has been tampered with—or even if such an attempt was made—is hence further increased.

The sealing bolt 10 can have a generally circular cross-section and, when seen from above, the first identity element 32 is arranged in a central portion, whereas the second identity element 34 is arranged in a peripheral area. By arranging the first and second identity elements 32, 34 in two separate zones, the first and second identity elements 32, 34 can be identified individually by means of an ultrasonic reading device placed above the seal head 28.

The sealing bolt 10 can further comprise an electronic storing device 60, such as e.g. a passive transponder, for storing installation data. By means of a customized tool used for installing the sealing bolt 10, installation data (such as date, time and place of installation, name of operator, container identification code, torque applied) can be stored in the storing device 60. It is thereby no longer necessary for an inspector to be present when the container is sealed. Installation data can be retrieved from the storing device 60 at any time for verification or logging.

For further security, the sealing bolt 10 can be provided with an integrity element 62 arranged between the seal body 16 and the seal head 28 such that, when the seal head 28 is rotated with respect to the seal body 16, the integrity element 62 is broken. Such an integrity element 62 can, if broken, provide a further indication that the sealing bolt 10 has been tampered with. The integrity element 62 can be linked to the seal body 16 by means of a torque shank 64, a link cylinder 65 and a torque pin 66. A hollow 67 is preferably formed in the seal body 16 to receive the torque shank 64 and link cylinder 65 therein.

An entrainment element 70 can further be arranged between the seal body 16 and the seal head 28. Such an entrainment element 70 comprises, in the embodiment shown in FIG. 3, a first protrusion 72 radially protruding from the outer wall 74 of the second end 20 of the seal body 16. The first protrusion 72 is arranged such that, when the seal head 28 is rotated in a tightening direction, indicated by arrow 76 in FIG. 3, a second protrusion 78 on the inner wall 80 of the seal head 28 abuts against the first protrusion 72. Further rotation of the seal head 28 in the tightening direction entrains the seal body 16 in the tightening direction. As the seal head 28 is rotated in the tightening direction, it remains stationary with respect to the seal body 16 and the integrity element 62 arranged between seal head 28 and seal body 16 is not broken. When the seal head 28 is however rotated in the loosening direction, indicated by arrow 82 in FIG. 3, the second protrusion 78 disengages the first protrusion 72 and the seal body 16 is not entrained in the loosening direction. As the seal head 28 is rotated and the seal body 16 remains stationary, the relative rotation between seal head 28 and seal body 16 entrains breakage of the integrity element 62.

The first and second protrusions 72, 78 can be integrally formed with the second end 20 of the seal body 16 or the seal head 28 respectively. Alternatively, the first and second protrusions 72, 78 can be formed by a grub screw protruding from the outer and inner walls 74, 80 respectively.

According to a preferred embodiment, the connection means 30 comprises an annular ring 84 which can be engaged in a first annular groove 86 in the outer wall 74 of the second end 20 of the seal body 16 and in a second annular groove 88 in the inner wall 80 of the seal head 28. The connection means 30 is arranged so as to allow relative rotational movement between the seat head 28 and the seal body 16.

As an alternative to the above-mentioned entrainment element, the annular ring 84 can comprise a protrusion, which engages with respective protrusions on the seal head and seal body in the tightening direction and which disengages with at least one of the protrusions on the seal head and seal body in the loosening direction.

The seal head 28 of the sealing bolt 10 can be configured and dimensioned so as to at least partially fit in a recess 94 arranged in the container lid 12. Such an arrangement further increases the difficulty to tamper with the sealing bolt 10 as access to the sealing bolt 10 is limited.

The invention claimed is:

1. A sealing bolt for sealing a container lid to a container body, said sealing bolt comprising:
    a first identity element configured so as to provide a first identification signal when sensed with an ultrasonic reading device;
    a second identity element configured so as to provide a second identification signal when sensed with an ultrasonic reading device; and
    a third identity element,
    wherein said third identity element comprises said first and second identity elements, a third identification signal being formed by the intersection points created by an overlap of said first and second identification signals.

2. The sealing bolt according to claim 1, wherein said sealing bolt comprises a seal body and a seal head.

3. The sealing bolt Sealing bolt according to claim 2, wherein said first identity element is arranged between said seal body and said seal head.

4. The sealing bolt according to claim 2, wherein said second identity element is arranged in said seal head.

5. The sealing bolt according to claim 2 further comprising an integrity element arranged between said seal body and said seal head such that, when said seal head is rotated with respect to said seal body, said integrity element is broken.

6. The sealing bolt according to claim 5, further comprising a torque pin for linking said integrity element to said seal body.

7. The sealing bolt according to claim 2, further comprising an entrainment element arranged between said seal body and said seal head, said entrainment element being arranged
    such that, when said seal head is rotated in a first direction, said seal body is entrained in rotation in said first direction by said seal head; and
    such that, when said seal head is rotated in a second direction, opposite to said first direction, said seal body is not entrained in rotation by said seal head.

8. The sealing bolt according to claim 7, wherein said first direction is a tightening direction of said sealing bolt and said second direction is a loosening direction of said sealing bolt.

9. The sealing bolt according to claim 2, wherein said seal head of said bolt is configured and dimensioned so as to at least partially fit in a recess arranged in a container body or container lid of the container to be sealed.

10. The sealing bolt according to claim 1, wherein said sealing bolt has a generally circular cross-section and wherein
    said first identity element is arranged in a central portion thereof, and
    said second identity element is arranged in a peripheral area thereof.

11. The sealing bolt according to claim 1, wherein at least one of said first and second identity elements comprises a stack of disks with randomly arranged notches.

12. The sealing bolt according to claim 11, wherein said disks are arranged at a random angular position to each other.

13. The sealing bolt according to claim 1, wherein at least one of said first and second identity elements comprises a plurality of bores having random depth.

14. The sealing bolt according to claim 1 further comprising a storing device for storing installation data.

15. A method for sealing a container lid to a container body, said method comprising:
    providing a container body and a container lid;
    providing a sealing bolt having a first identity element, a second identity element and a third identity element, said first and second identity elements providing first and second identification signals respectively when sensed with an ultrasonic reading device, a third identification signal being formed by the intersection points created by an overlap of said first and second identification signals;

connecting said container lid to said container body; and connecting said sealing bolt between said container lid and said container body, such that said sealing bolt is at least partially broken if said container lid and said container body are separated.

16. The method according to claim 15, further comprising: storing said first, second and third identification signals in a storing device.

17. A method for verifying the identity of a sealed container, said container being sealed according to claim 15, said method comprising:

measuring a first identification signal from said first identity element;

measuring a second identification signal from said second identity element;

forming said third identification signal from the intersection points obtained by an overlapping of said first and second identification signals;

comparing said first, second and third identification signals with corresponding signals obtained after sealing of the container; and concluding to a possible tampering of the sealing bolt if at least one of said newly measured signals does not correspond to its previously measured counterpart.

* * * * *